Aug. 29, 1967   H. FRÖHLICH   3,339,092

MAGNETOHYDRODYNAMIC GENERATOR

Filed Oct. 26, 1964

INVENTOR

BY

United States Patent Office 3,339,092
Patented Aug. 29, 1967

3,339,092
MAGNETOHYDRODYNAMIC GENERATOR
Heinz Fröhlich, Erlangen, Germany, assignor to Siemens-Schuckertwerke Aktiengesellschaft, Berlin-Siemensstadt, Germany, a corporation of Germany
Filed Oct. 26, 1964, Ser. No. 406,475
Claims priority, application Germany, Oct. 26, 1963,
S 88,038
9 Claims. (Cl. 310—11)

My invention relates to a magnetohydrodynamic generator or magnetoplasmadynamic generator, hereinafter referred to as an MHD generator.

An MHD generator, as is well known, has electrodes between which an electrically conducting medium flows with great velocity. If a magnetic field is applied perpendicularly to the direction of flow and to an imaginary plane through the electrodes, electric power can be drawn from the electrodes.

MHD generators of this type are illustrated and described in the publication, "Power," of November 1959, beginning on page 62 thereof.

Waste or exhaust gases of a flame as produced by the burning of oils, such as heating oils for example, with a supply of air and slightly ionizable materials (seed material) such as potassium, are employed in MHD generators for the direct conversion of heat to electrical energy. The waste gases from the flame are so greatly ionized that they have the characteristics of a plasma.

The plasma can also be produced by means of nuclear energy. For that purpose the heating effect of the nuclear reaction and ionizing effect of the radioactive radiation can be utilized.

An MHD generator of conventional type is schematically shown in FIG. 1 of the drawings. A plasma having a temperature of about 3000° C. is formed in a combustion chamber 4 and expands through a nozzle 5 in the direction of the arrow $v$ thereby achieving a flow velocity ($v$) in the order of magnitude of 1000 meters per second. Electrodes 8 and 9 located opposite one another are in contact with the plasma in the flow chamber 6 of the generator channel. A magnetic field B having lines of force (represented by the small circles) extending out of the plane of the drawing, lies perpendicular to the drawing plane. A negative electrical field is thereby induced in the plasma in the direction of the arrow $E_i$ or a positive field arises between the electrodes in the direction of this arrow.

The no-load voltage between the electrodes is approximately proportional to the product of the magnetic field, the flow velocity of the conducting medium and the spacing between the electrodes. Considering the no-load voltage as a function of the applied magnetic field, it then appears that the no-load voltage rises about 5 K oe (kilo-oersted) more gradually than linearly with the magnetic field. This indicates an increase of the developing generator internal resistance as a ratio of no-load voltage to short-circuit current.

The reason for the slower increase in the no-load voltage with MHD generators is sometimes attributed to a Hall effect. If no precautions are taken, such as subdividing the electrodes transversely to the flow direction, the Hall effect can lead to compensating currents across the electrodes and to eddy currents in the plasma.

A device is described in the German Patent 692,706 wherein a gas or steam current flows between pairs of electrodes that are located opposite one another along the flow path. In the German patent a circuit is described by means of which the voltage across the electrodes is added through transformers, with galvanic separation of the electrode pairs. With an applied alternating magnetic field, the generator of the German patent can produce alternating current.

The electrodes are subdivided transversely to the plasma flow direction or several electrode pairs are provided so that due to the galvanic separation of the electrode pairs, eddy currents or compensating currents across the electrodes can be avoided. These would otherwise be released or produced by a voltage component (for example, a Hall voltage) in the direction of the flow path.

A generator with a plurality of electrode pairs is also known in which the electrodes are electrically connected to one another at the same potential and are offset with respect to one another in the direction of the flow path. An obliquely arranged end electrode is located respectively opposite individual odd offset electrodes located respectively at the flow path inlet and outlet, and the summation of energy is withdrawn from both end electrodes. This known generator thus relates to a series connection of electrode pairs or to the voltage components induced transverse to the flow path direction in the plasma due to the Hall voltage. Thereby the voltage produced by the generator lies between the electrodes adjacent each other along a side of the flow path so that strong compensating currents must be reckoned with.

It is an object of my invention to provide an MHD generator affording a structural improvement over the aforementioned known generators that have a plurality of electrode pairs, which opposes or tends to minimize the increase of the generator inner resistance or the slowing down in the increase of the no-load voltage with increasing applied magnetic field. It is also an object of my invention to provide an MHD generator of such construction that with the withdrawal of load current or with change in the load current, the Hall effect produced thereby leads to no power loss of the generator.

With these objects in view and in accordance with my invention, I provide an MHD generator with galvanically separated electrode pairs in engagement with a flowing electrically conducting medium wherein the electrodes that are located opposite one another are offset or are in staggered arrangement at positions along the flow path in order to achieve maximum voltage across the electrodes. By adjusting the amount of offset between the electrodes of the electrode pairs during operation, the generator is accommodated in accordance with the invention to varying operating conditions. For this purpose, the electrodes can be adjusted by means of a servomotor which is controlled by a voltage regulator in dependence upon the voltage of the electrodes. The electrodes are then always placed opposite one another pairwise in the direction of the field intensity that is induced and that results from the Hall components.

With a generator constructed in accordance with my invention, one can also sum the individual voltages of the electrodes. They can furthermore also be employed in separate load circuits. The important characteristic is that in accordance with my inventive generator there is obtained respectively between the opposing electrodes of a pair, a greater maximum or resultant voltage than the transverse voltage. Since the generator constructed in accordance with my invention supplies maximum terminal voltage while preventing eddy current losses, it is then possible to construct MHD generators of greater power than that of conventional generators of comparable size.

It is of course known that current conduction in plasma takes place in the same manner as with a metallic conducting medium, i.e. by means of electrons. The mobility of ions in the plasma is negligible when compared with the mobility of electrons. Due to the flow velocity of the plasma a force acts on the electrons through the magnetic field in the direction of the negatively induced field. On the other hand, electrons are diverted in a magnetic field into an orbital path (due to Larmor precession). If the mean free path λ of the electrons is small with respect to the diameter $d$ of the Larmor orbit, due to frequent collisions the last-mentioned phenomenon will take place only slightly or not at all. If λ and $d$ are of the same order of magnitude, the electrons will traverse, between collisions, considerable portions of an orbital path. The electrons are thereby retarded in the plasma flow path direction as compared to the positive ions and it appears as though a field is operative in the flow path direction, which is occasionally identified as a Hall effect but which, however, in the strict physical sense is not a Hall effect. If a load current flows between the electrodes through an outer load resistance, an actual Hall effect is then realized due to the applied magnetic field. Both phenomena operate in the same general direction so that the field produced in the plasma is rotated, and they are referred to herein collectively by the term Hall effect. The generator constructed in accordance with my invention endeavors to utilize these resultant fields directly.

The features which are considered as characteristic for my invention are set forth in the appended claims.

Although the invention has been illustrated and described as embodied in a magnetohydrodynamic generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
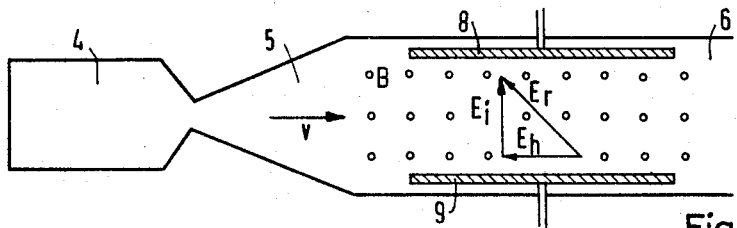
FIG. 1 is a schematic view of a known MHD generator to facilitate an understanding of the voltage components normally arising in the plasma.

FIG. 1, described in greater detail hereinabove, is a schematic view of a generalized conventional MHD generator. In addition to the induced electrical field vector $E_i$ of the voltage components extending transversely to the plasma flow path direction, the "Hall component" vector $E_h$ as well as the resulting field vector $E_r$ are shown.

Figure 2:
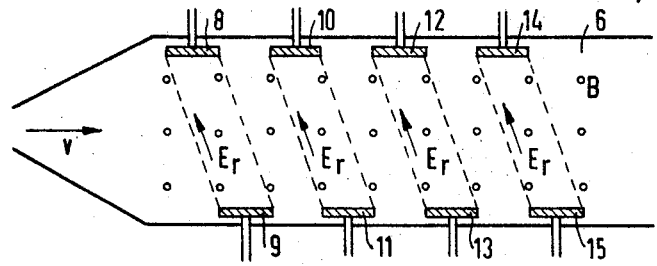
FIG. 2 is a schematic view of the electrode arrangement of an MHD generator in accordance with my invention.

The arrangement of the electrodes in the generator in accordance with my invention is shown in FIG. 2. Plasma flows with a velocity $v$ through the flow space 6 of the illustrated generator channel. A resultant field is produced in the direction of the arrow $E_r$ due to the magnetic field B extending perpendicularly out of the plane of the drawing, and as a result of the aforedescribed "Hall effect." Electrical devices can be energized with electrical energy by making full use of the resulting field intensity across the electrode pairs consisting of the respective electrodes 8 and 9, 10 and 11, 12 and 13, and 14 and 15, whose edges as shown in FIG. 2 are aligned respectively along a broken line extending in the direction of the resulting field $E_r$ as shown by the associated arrow. In other words, the opposed electrodes are offset one from the other in the flow path direction to such an extent as to obtain maximum voltage thereacross. Due to the fact that the electrodes are located diagonally or obliquely opposite one another, and moreover, because of the greater spacing between the electrodes in the direction of the resulting field, there is produced between each pair of electrodes a greater voltage than for a pair of electrodes that are placed opposite one another perpendicularly to the flow path direction.

Figure 3:
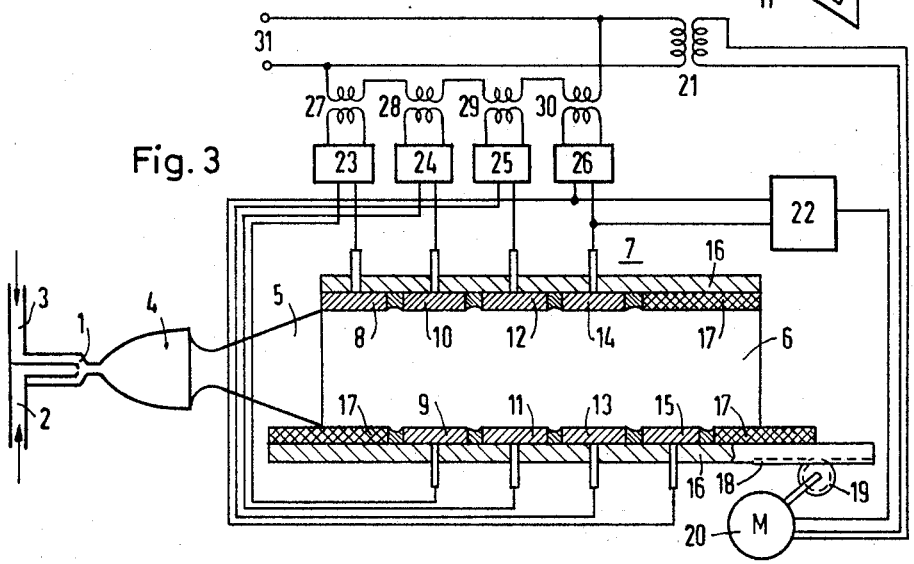
FIG. 3 is a schematic view of an embodiment of my invention including auxiliary components and circuits.

An embodiment of an MHD generator constructed in accordance with my invention is shown schematically in FIG. 3. Heating oil supplied through a pipe 2 and oxygen and potassium carbonate as seed material are supplied through a pipe 3 into a ring nozzle 1 through which they are sprayed into a combustion chamber 4. A plasma is produced by the combustion thereof and is accelerated to a high flow velocity through a nozzle 5 and passes through a flow chamber 6 of a generator channel 7. It is of course understood that the generator channel 7 is closed in front and behind the plane of the drawing by walls to which pole shoes for providing a magnetic field are attached.

The electrical field produced in the plasma is rendered utilizable in the embodiment through four electrode pairs, however, a different number of electrode pairs can also be employed, such as especially one pair only. The individual electrodes on one side of the flow path (8, 10, 12, 14 or 9, 11, 13, 15) can be separated from one another by electrically insulating cement layers. The electrodes of each side are respectively connected with a holder 16 which is provided with leads passing therethrough to the electrodes. In the flow direction, the electrodes on each side can be supplemented with electrically insulating material 17 to form complete walls. One or both of the holder walls 16 carrying the electrodes are displaceable in the flow direction and the electrodes are offset with respect to one another. As shown in FIG. 3, the set-off distance between electrodes is adjusted by moving the lower wall with a synchromotor 20; for example, by means of a gear 19 and a rack 18 in a well known manner. Instead of the aforementioned adjustment device it is also possible to arrange the electrodes for movement in the form of a rotating band.

Each electrode pair can be connected with a vibrator by means of which alternating voltages can be produced. The vibrators 23, 24, 25 and 26 can together feed a network or circuit through transformers 27, 28, 29 and 30. By interconnecting the transformers, the electrode pairs remain galvanically separated from one another so that no compensating currents can develop between the electrode pairs. In the embodiment shown in FIG. 3, the transformers are series connected on the secondary side and can be further connected with a load circuit across the terminals 31.

The synchromotor 20 is controlled by a voltage regulator 22 in a known manner, for example actuable so as to rotate in a forward or reverse rotary direction or to stop, as represented schematically by the line connecting the regulator 22 and the motor M in FIG. 3. The control circuit receives as pilot information, for example, the voltage between the electrodes 14 and 15 of one electrode pair. The control circuit can be so constructed that after a specific time interval or after other criteria, for example after change of voltage, the motor 20 is switched on for such a period of time as to rotate in a forward or in a reverse direction as the case may be, until the voltage measured across the electrodes 14 and 15 drops off. Then the motor is rotated in the other rotary direction and is maintained in operation until the voltage measurement falls off; when the voltage falls off, the motor is then switched off. A correction of the reverse rotation to the intermediate voltage maximum of the actually controlling operating condition can also be provided. The synchromotor 20 is supplied with the energy produced by the generator and can for this purpose for example be connected across a transformer 21 to the circuit or network.

Figure 4:
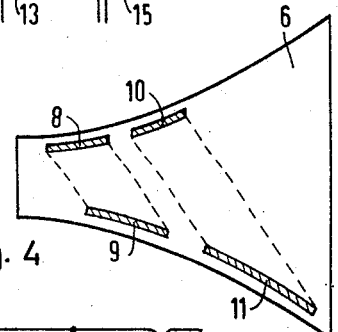
FIG. 4 is a schematic view of a modified form of the arrangement shown in FIG. 2.

The electrodes are of such length in the plasma flow direction, that the "Hall voltage" in the plasma across the length of an electrode is small relative to the usable voltage drawn from between two electrodes of a pair. With widening generator channels, for example with channels having the shape of Laval nozzles, the electrodes can be located tangentially in the channel, as shown in FIG. 4. In FIG. 4, two electrode pairs having electrodes 8 and 9 as well as 10 and 11 are located in the flow chamber 6 of a generator channel tangentially to the arcuate channel wall. The lengths of the electrodes are different and are so chosen that the electrodes of each pair have substantially the same amount of working surface. As shown by the broken lines, the edges of the electrodes can be connected by parallel lines that are in turn parallel to the direction of the resultant voltage $E_r$, which is the vector sum of the Hall voltage $E_h$ and the induced electric field $E_i$.

I claim:

1. MHD generator comprising a flow channel for the passage of ionized gaseous medium in a given flow direction, at least one pair of electrodes mounted in said flow channel spaced one from the other transversely to said flow direction and engageable by the ionized gaseous medium, means for producing a magnetic field through said flow channel transversely to said flow direction, and to a plane in which said pair of electrodes are located for inducing an electrical field in said ionized gaseous medium, said electrodes being offset one from the other in said flow direction, the forward and rearward edges of said electrodes in said flow direction being respectively in planes substantially parallel to the vector direction of a resultant electrical field produced in the ionized gaseous medium between said electrodes.

2. MHD generator according to claim 1 including means for adjusting the offset distance of said electrodes during operation of the generator.

3. MHD generator comprising a flow channel for the passage of ionized gaseous medium in a given flow direction, a plurality of electrode pairs mounted in said flow channel, the electrodes of each pair being spaced apart one from the other transversely to said flow direction at opposite sides of said flow channel and engagable by the ionized gaseous medium, means for producing a magnetic field, through said flow channel transversely to said flow direction and to a plane in which said plurality of electrode pairs are located for inducing an electrical field in said ionized gaseous medium, the electrodes of said pairs at one side of said flow channel being displaceable together in said flow direction to a position in which they are offset from the respective electrodes of said pairs at the other side of said flow channel, the forward and rearward edges in said flow direction of the electrodes of each pair of electrodes being respectively in planes substantially parallel to the vector direction of a resultant electrical field produced in the ionized gaseous medium between said electrodes.

4. MHD generator comprising a flow channel for the passage of ionized gaseous medium in a given flow direction, a plurality of electrode pairs mounted in said flow channel, the electrodes of each pair of being spaced apart one from the other transversely to said flow direction at opposite sides of said flow channel and engageable by the ionized gaseous medium, means for producing a magnetic field through said flow channel transversely to said flow direction and to a plane in which said plurality of electrode pairs are located for inducing an electrical field in said ionized gaseous medium, the electrodes of said pairs at one side of said flow channel being offset from the respective electrodes of said pairs at the other side of said flow channel, the forward and rearward edges in said flow direction of the electrodes of each pair of electrodes being respectively in planes substantially parallel to the vector direction of a resultant electrical field produced in the ionized gaseous medium between said electrodes, whereby a maximum voltage is applied across the electrodes of each electrode pair, and means for galvanically separating said electrode pairs from one another.

5. MHD generator according to claim 4 wherein said means for galvanically separating said electrode pairs from one another consists of a vibrator and a transformer respectively connected in series with each of said electrode pairs.

6. MHD generator comprising a flow channel for the passage of ionized gaseous medium in a given flow direction, a plurality of electrode pairs mounted in said flow channel, the electrodes of each pair being spaced apart one from the other transversely to said flow direction at opposite sides of said flow channel and engageable by the ionized gaseous medium, means for producing a magnetic field through said flow channel transversely to said flow direction and to a plane in which said plurality of electrode pairs are located for inducing an electrical field in said ionized gaseous medium, the electrode of each pair at one side of said flow channel being offset from the electrode of the respective pair at the other side of said flow channel, and means for adjusting the offset position of at least the electrodes at said one side of said flow channel in said flow direction so that the forward and rearward edges in said flow direction of the electrodes of each pair of electrodes are respectively in planes substantially parallel to the vector direction of a resultant electrical field produced in the ionized gaseous medium between said electrodes, whereby a maximum voltage is applied across the electrodes of each electrode pair.

7. MHD generator according to claim 6, wherein said adjusting means comprises a reversible motor and a transmission operatively connected to the electrodes at said one side of said flow channel.

8. MHD generator according to claim 7 wherein said motor is a synchromotor, and voltage regulator means connected to one of said electrode pairs and to said motor for controlling the operation of said motor in dependence on the voltage across said one electrode pair.

9. MHD generator comprising a flow channel for the passage of ionized gaseous medium in a given direction, said flow channel flaring outwardly in said direction, a plurality of electrode pairs mounted in said flow channel, the electrodes of each pair being spaced apart one from the other transversely to said flow direction at opposite sides of said flaring flow channel and engageable by the ionized gaseous medium, said electrodes being substantially tangent to the flaring sides of said flow channel, means for producing a magnetic field through said flow channel transverse to said flow direction and to a plane in which said plurality of electrode pairs are located for inducing an electrical field in said ionized gaseous medium, the electrodes of said pairs at one side of said flow channel being offset from the respective electrodes of said pairs at the other sides of said flow channel, the forward and rearward edges in said flow direction of the electrodes of each pair of electrodes being respectively in planes substantially parallel to the vector direction of a resultant electrical field produced in the ionized gaseous medium between said electrodes, whereby a maximum voltage is applied across the electrodes of each electrode pair.

References Cited

UNITED STATES PATENTS

| 3,182,213 | 5/1965 | Rosa | 310—11 |
| 3,183,380 | 5/1965 | Hurwitz | 310—11 |

MILTON O. HIRSHFIELD, *Primary Examiner.*

D. X. SLINEY, *Examiner.*